Sept. 7, 1926.
G. N. MISSOGENIS
1,598,617
AEROPLANE FAN AND SWIVEL JOINT SUPPORT THEREFOR
Filed August 5, 1920
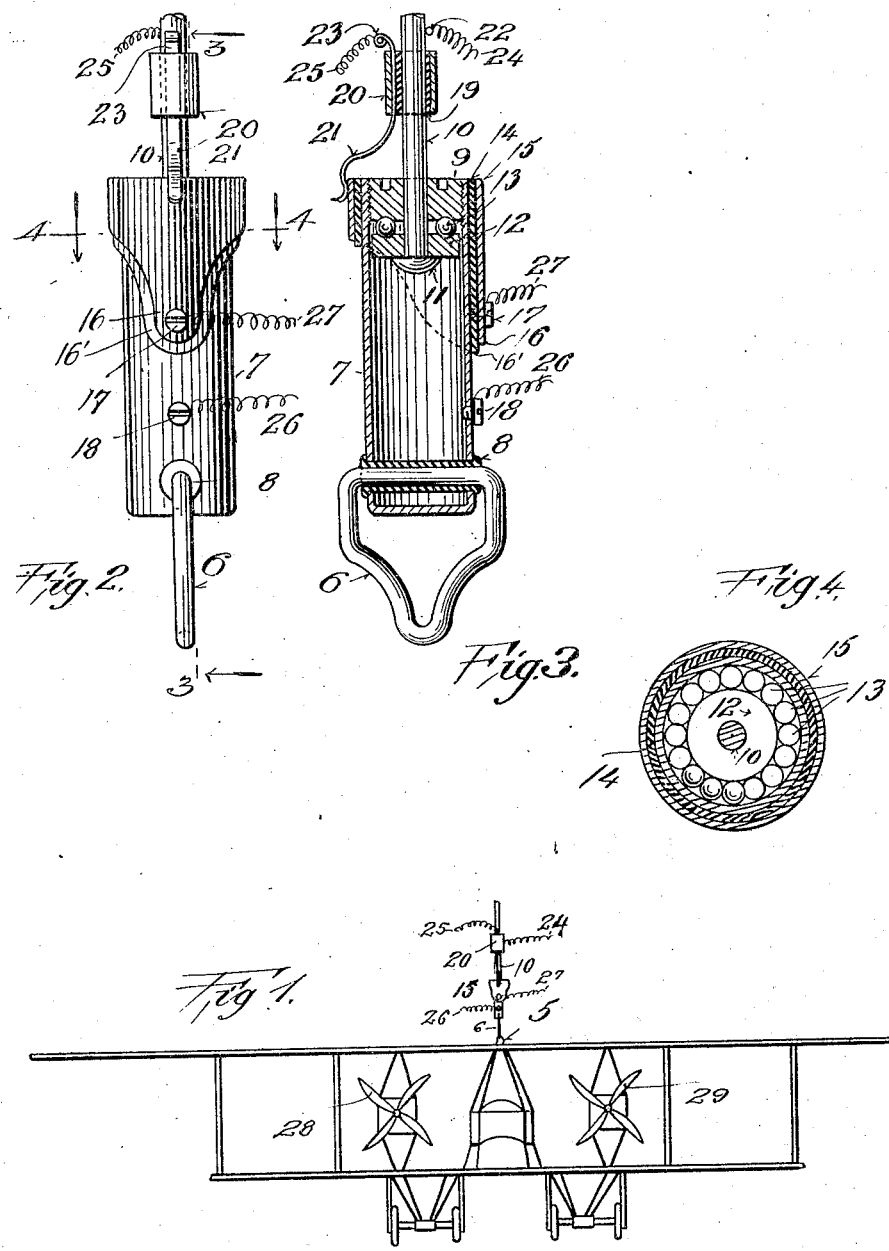

Patented Sept. 7, 1926.

1,598,617

UNITED STATES PATENT OFFICE.

GEORGES N. MISSOGENIS, OF NEW YORK, N. Y.

AEROPLANE FAN AND SWIVEL-JOINT SUPPORT THEREFOR.

Application filed August 5, 1920. Serial No. 401,467.

My invention consists in a novel construction and adaptation of an aeroplane of reduced size and modified construction, suitable for use as an electric fan, and in an electrically conducting swivel joint support therefor, whereby it is possible to suspend the modified aeroplane, and by the action of its own propellers, cause the same to rotate on its support to thereby successively agitate the surrounding atmosphere.

The objects of my invention therefore include the modification, construction and adaptation of an aeroplane for an electric fan, and in the construction of a suitable electric swivel joint support whereby the modified aeroplane is suspended. Other objects will appear hereinafter from the description and claims.

I attain these objects by the mechanism illustrated in the accompanying drawing, in which Fig. 1 represents a front elevation of my invention, showing an aeroplane suitable for an electric fan.

Fig. 2 represents an elevation of my new swivel joint support whereby the plane is suspended or supported.

Fig. 3 represents a longitudinal section of the said support taken on lines 3—3 of Fig. 2, showing the construction and electric connections.

Fig. 4 represents a cross section on lines 4—4 of Fig. 2.

Similar numerals refer to similar parts throughout the several views.

Referring now to the drawings, Fig. 1 represents an aeroplane of the biplane type, but of modified form and reduced size, and so equipped as to be suitable for an electric fan. It is obvious that other types of aeroplanes will serve also for this purpose. The plane so used is pivotally supported by means of my novel swivel joint support, which is attached to the plane at a point 5, by the link 6, or equivalent device. In my preferred form, the construction of this support comprises a main body portion 7, which may conveniently be a piece of tubing, having secured thereto, at one end, a bearing surface or shell 8, of insulating material, into which is fitted the holding link 6. On the opposite end of said tube, or body portion, there is secured a bearing block 9, also of conducting material, which block is provided with a central bore, through which passes a supporting stem or rod 10. The rod 10 is provided with a head 11. A second bearing block 12 is provided to tightly fit on said stem, but to move freely in the tube 7. The bearing blocks 9 and 12 are provided with grooves into which are fitted ball bearings 13. On the end of the body portion containing the bearing surfaces there is tightly fitted a short end of tubing or ring 14, of insulating material, and over this ring there is clamped a conductor tube or ring 15 of similar shape and form as ring 14. Both the insulating and the conductor rings have a depending portion or ear 16' and 16 respectively, provided with a registering screw hole for a binding screw 17 which does not reach through the insulation so as to form contact with the inner tubing 7. A second binding screw 18 is attached to the body portion of the supporting connection.

On the supporting stem 10, at a suitable distance from the bearing head, there is securely fastened a holder ring 19 of insulating material. On this holder ring there is secured a clamping ring 20, of conducting material, and between the rings 19 and 20 there is clamped a conductor finger 21, of spring material. Suitable binding screws or clips 22 and 23 connect conductor wires 24 and 25 to the supporting stem and the conductor finger, respectively.

It will be observed that the free end of the conductor finger presses against the conductor ring 15, and is in electrical contact therewith.

Conducting wires 26 and 27 complete the respective electric connections to continuously supply current to an electric motor, or motors, located on the aeroplane, for the purpose of driving the propellers 28 and 29. When the propellers are put into operation, by a proper adjustment, the plane will slowly spin, or rotate, on the swivel joint support above described, and will thereby agitate the surrounding air within a given radius, as may be desired.

While I have disclosed a specific form of electric swivel joint connection, and have described and illustrated a conventional type of aeroplane so modified and arranged as to make it suitable for its new use, I wish it to be expressly understood that I do not desire to be limited thereby, as it is obvious to those skilled in the art herein, concerned, that many changes, modifications and combinations of arrangement of the various parts may be effected without departing from the spirit and scope of my invention, and as the same is set forth herein, and by the appended claims.

Having set forth the objects and nature of my invention, and a construction embodying the principles thereof, what I claim as new and useful, and of my own invention, and desire to secure by Letters Patent is:

1. In an electric swivel joint connection for pivotally supporting aeroplane fans, and for supplying electric current to a motor on said aeroplane, a conducting supporting member, an insulated link at one end of said member, an electrically conducting swivel joint at the other, a conducting stem extending from said joint an insulated holder on said stem and a clip contact extending from said holder to make contact with one member of said joint.

2. An electric conducting swivel joint support, comprising a main body portion of conducting material, an insulated shell in one end carrying a supporting link, a bearing head and an insulated contact ring at the other end, a supporting stem passing through said bearing head and forming therewith a swivel joint and a conductor member carried on said stem but insulated therefrom.

3. A support for suspending aeroplane fans comprising an electric conductor body part having a bearing head and an insulating sleeve, a conducting sleeve fitted over said insulating sleeve, a support stem in said bearing head, and a contact member on said stem but insulated therefrom for making electric contact with said conducting sleeve.

In testimony whereof I have hereunto set my hand on this 29th day of July, A. D. 1920.

GEORGES N. MISSOGENIS.